(12) United States Patent
Gerendás et al.

(10) Patent No.: US 9,422,830 B2
(45) Date of Patent: Aug. 23, 2016

(54) WASHER OF A COMBUSTION CHAMBER TILE OF A GAS TURBINE

(71) Applicant: Rolls-Royce Deutschland Ltd & Co KG, Blankenfelde-Mahlow (DE)

(72) Inventors: Miklós Gerendás, Am Mellensee (DE); Tijana Filipova, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 62 days.

(21) Appl. No.: 14/573,948

(22) Filed: Dec. 17, 2014

(65) Prior Publication Data
US 2015/0176434 A1   Jun. 25, 2015

(30) Foreign Application Priority Data
Dec. 18, 2013   (DE) .......................... 10 2013 226 488

(51) Int. Cl.
*F16B 43/00* (2006.01)
*F01D 25/28* (2006.01)
*F23R 3/00* (2006.01)

(52) U.S. Cl.
CPC ................ *F01D 25/28* (2013.01); *F16B 43/00* (2013.01); *F23R 3/002* (2013.01); *F23R 2900/03041* (2013.01); *F23R 2900/03042* (2013.01); *F23R 2900/03044* (2013.01)

(58) Field of Classification Search
CPC ........ F16B 43/00; F16B 43/003; F23R 3/002; F23R 2900/03041; F23R 2900/03042; F23R 2900/03044; F01D 25/28
USPC .......................................... 411/531, 546, 918
See application file for complete search history.

(56) References Cited

U.S. PATENT DOCUMENTS

| | | | | |
|---|---|---|---|---|
| 4,647,228 A | * | 3/1987 | Jensen | F16C 11/00 384/251 |
| 4,749,029 A | | 6/1988 | Becker et al. | |
| 4,749,298 A | | 6/1988 | Bundt et al. | |
| 4,820,097 A | | 4/1989 | Maeda et al. | |
| 4,990,044 A | * | 2/1991 | Kimak | F16B 37/0842 411/301 |
| 5,175,999 A | * | 1/1993 | Hara | F16H 41/30 415/175 |

(Continued)

FOREIGN PATENT DOCUMENTS

| | | |
|---|---|---|
| DE | 10114619 | 12/2001 |
| EP | 0576435 | 1/1994 |

(Continued)

OTHER PUBLICATIONS

European Search Report dated Apr. 28, 2015 from counterpart App No 14194726.7.

(Continued)

*Primary Examiner* — Roberta Delisle
(74) *Attorney, Agent, or Firm* — Timothy J. Klima; Shuttleworth & Ingersoll, PLC

(57) ABSTRACT

A washer of a combustion chamber tile of a gas turbine having a round disk-shaped basic body provided with a central recess and a flat contact surface arranged on a first side of the washer, wherein several groove-like air ducts are provided on a second side that extend from a circumferential rim of the washer radially relative to the center axis of the washer, and in the center area of the washer in the axial direction.

20 Claims, 3 Drawing Sheets

(56) References Cited

U.S. PATENT DOCUMENTS

Figure 1:
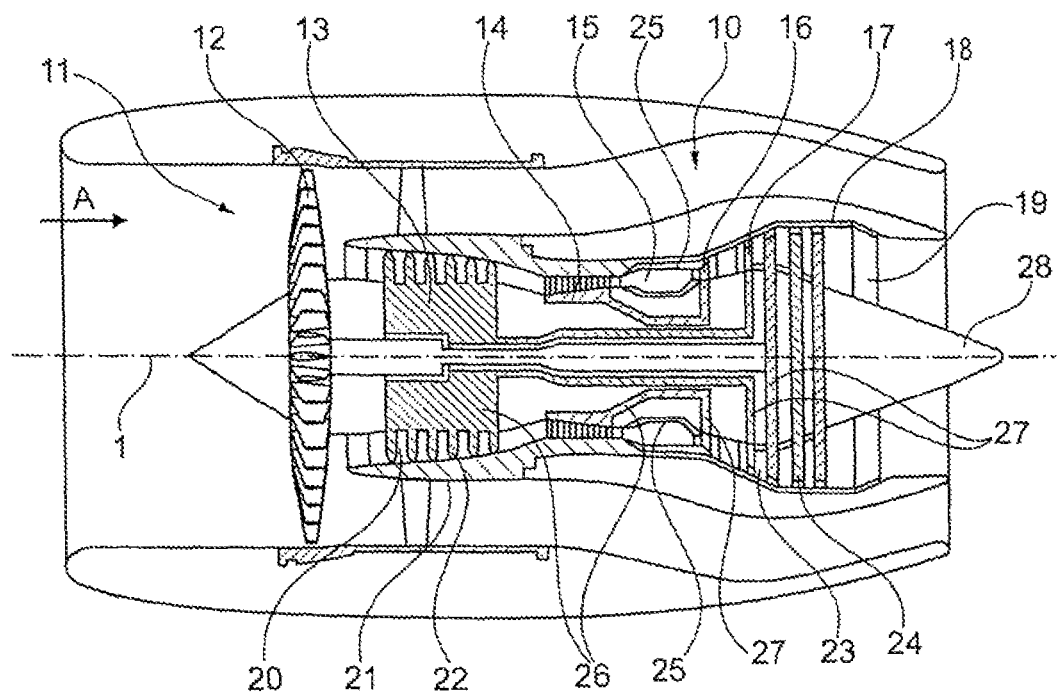

| | | | | |
|---|---|---|---|---|
| 5,359,824 | A * | 11/1994 | Koberstein | F16B 43/00 411/148 |
| 5,628,587 | A * | 5/1997 | Lesslie | E21D 21/0086 405/259.1 |
| 6,502,994 | B2 * | 1/2003 | Jackson | F16C 17/04 384/368 |
| 6,532,929 | B2 | 3/2003 | Antonevich et al. | |
| 6,692,083 | B2 * | 2/2004 | Latham | E21C 35/18 299/104 |
| 7,887,240 | B2 * | 2/2011 | Marathe | F16C 17/04 384/303 |
| 8,186,904 | B2 * | 5/2012 | Snadden | F16B 21/20 384/535 |
| 9,151,172 | B2 * | 10/2015 | Fingerman | F16H 41/26 |
| 9,212,687 | B2 * | 12/2015 | Sayre | F16B 43/00 |
| 2011/0011095 | A1 | 1/2011 | Ladd et al. | |

FOREIGN PATENT DOCUMENTS

| | | |
|---|---|---|
| EP | 1710501 | 10/2006 |
| EP | 2295865 | 3/2011 |
| EP | 2743585 | 6/2014 |
| JP | S59-162323 | 9/1984 |
| WO | 92/16798 | 10/1992 |

OTHER PUBLICATIONS

German Search Report dated Mar. 25, 2014 from counterpart App No. 10 2013 226 488.7.

* cited by examiner

WASHER OF A COMBUSTION CHAMBER TILE OF A GAS TURBINE

This application claims priority to German Patent Application DE102013226488.7 filed Dec. 18, 2013, the entirety of which is incorporated by reference herein.

This invention relates to a washer of a combustion chamber tile of a gas turbine.

In particular, the invention relates to a washer in accordance with the features described herein.

The invention therefore relates to a washer of a combustion chamber tile of a gas turbine having a round disk-shaped basic body provided with a central recess. Washers of this type are fitted onto threaded bolts that are designed in one piece with the combustion chamber tiles or are fastened to these. The threaded bolts pass through recesses in the combustion chamber wall or supporting structure and are secured by means of nuts. To ensure a firm contact of the nuts on the one hand and to allow compensation of tolerances in the recesses of the combustion chamber wall on the other hand, washers are inserted in between.

Cooling air is blown through the combustion chamber wall, in which a plurality of impingement cooling holes is provided, onto that side of the combustion chamber tiles facing away from the combustion chamber interior. Cooling is performed to cool the combustion chamber tiles and to prevent thermal damage. This results in the difficulty, in the fastening area of the threaded bolts, to suitably cool this area, which has a correspondingly thicker design.

Tiled combustion chambers of gas turbines are known from EP 0 576 435 B1, EP 0 741 268 B1, EP 1 710 501 A2. The tiles are used in gas-turbine combustion chambers to protect the supporting and sealing structure from the intensive heat radiation of the flame. The supporting structure thus remains cool and strong.

US 2011/0011095 A1 shows a tiled combustion chamber with a porous washer, through which cooling ducts are passed from that side contacted by the nut to the opposite side. These ducts permit impingement cooling of the tile in the area covered by the washer. By covering an oblong hole with the oval washer, cooling air is supplied close to the bolt only on one side and is not specifically directed onto the transition from the tile to the bolt. No additional cooling air is supplied to the tile on the opposite side. The result is an asymmetrical temperature distribution inside the tile in the area around the bolt, increasing the tensions in the transition between bolt and tile.

The object underlying the present invention is to provide a washer of the type specified at the beginning which, while being simply and cost-effectively designed and producible, enables efficient cooling of the combustion chamber tile in the area of the threaded bolt.

It is a particular object to provide solution to the above problems by a combination of features described herein. Further advantageous embodiments will become apparent from the present description.

In accordance with the invention, it is thus provided that the washer includes a round, disk-shaped basic body with a central recess, said basic body having a first side designed flat and onto which the nut can be placed. The opposite second side of the washer in accordance with the invention has several groove-like air ducts through which cooling air can flow in from the circumferential rim of the washer. The cooling air is, in the washer in accordance with the invention, initially routed in the radial direction and then diverted in the axial direction relative to the center axis of the washer. Hence, the cooling air is introduced evenly around the entire circumference of the washer and so supplied evenly to the entire circumference of the threaded bolt or stud bolt. The washer in accordance with the invention thus forms a porous overall structure, through which a large air volume can be supplied.

Due to the flat first side of the washers, on which no groove-like air ducts or the like are provided, it is possible to produce the washer in simple manner, for example by means of a sintering method or a similar manufacturing method. Alternatively, the washer in accordance with the invention can also be manufactured by means of a casting method or by a depositioning method (laser depositioning or electron-beam & positioning).

Furthermore it is also possible in accordance with the invention to manufacture the washer by a purely mechanical method or using a MIM (metal injection moulding) method. Simple and cost-effective manufacture is, as already mentioned, facilitated in that the cooling air structures are located neither on the first side nor on the circumference, but are arranged starting from the second side only.

By the diversion in accordance with the invention of the cooling air that initially enters in the radial direction into the axial direction, the cooling air is routed such that it impacts the base area of the threaded bolt, so that this critical area can be cooled particularly well. Since the second side of the washer contacts the surface of the combustion chamber wall, air ducts are created in each case which can be designed flow-optimized, it proves particularly advantageous here for the cross-section of the air ducts to be designed semi-circular or semi-elliptical. In particular with regard to manufacture as a sintered product, it is favourable when the respective axes of the semi-circular or semi-elliptical cross-sections are not located in the second side of the washer, but at a distance therefrom. The transitional wall areas of the air ducts are thus angled at more than 90°, so that removing a pressing tool or the like from the mould for manufacturing the sintered body is facilitated.

The air ducts are preferably designed rounded both at the intake area, seen from the circumferential side, and at the diversion area. The diversion from the radial area into the axial area too is achieved preferably with a radius greater than the radius of the air duct or of both half-axes of the basic elliptical cross-section. Here too, the wall close to the cooling air outlet is not completely parallel to the axis of the central recess of the washer. This too promotes producibility on the one hand and the flow of the cooling air on the other hand.

It is particularly favourable for three to six cooling ducts to be provided on the circumference, but it is also possible to provide a different number of cooling ducts in the washer in accordance with the invention. It is particularly important here for the cooling air flowing out of the axial areas to flow almost parallel to the surface of the threaded bolt or stud bolt in the direction of the combustion chamber tile. To improve the flow guidance, it can furthermore be particularly favourable to extend the washer at its second side by means of a projection, which can extend through a recess of the combustion chamber wall and is used to guide the cooling air more precisely to the base area of the threaded bolt. This recess of the combustion chamber wall too can in accordance with the invention be provided with a slightly conical cross-section which has a slightly larger diameter on that side of the combustion chamber wall facing away from the nut than on the upper side facing the nut.

To improve the inflow of cooling air into the cooling air ducts, it can be provided to design an intake radius in particular at the outer rim of the washer.

To prevent the washer from cutting into the combustion chamber wall, the transitions between the cooling ducts and the contact surface and also the transition of the contact surface to the circumferential rim are carefully rounded. For the same reason, the transition between the contact surface and the collar extending through the combustion chamber wall is provided with an undercut.

In accordance with the invention, the washer can be designed round or oval for being used in round holes of combustion chamber tiles or in oblong holes of combustion chamber tiles, to cover larger angle ranges, and to compensate for production tolerances or assembly tolerances, particular because during assembly the threaded bolts cannot be passed through the combustion chamber wall along their axis.

The following advantages in particular are achieved in accordance with the invention:

The even output of cooling air through three or more cooling ducts in such a way that the cooling air flows out of the washer in the direction of the combustion chamber tile generates a convective cooling at the transition between stud bolt and combustion chamber tile. As a result, the temperature drops at this point and the service life of the combustion chamber tile is prolonged.

The definition of ail details on one side of the washer or the surface of the combustion chamber tile respectively, simplifies production. With mechanical production, the side without details is still connected to the bar material on which the clamp engages, and the other side is freely accessible for machining. In precision casting, the feeders and risers are on the side without details and can then be simply cut off flush. In MIM production, the washer contacts the smooth and detail-free upper side during sintering and remains exactly flat. All details on the bottom side can shrink without negative effects during sintering.

The angles greater than 90° in the material for the edges between the air duct and the bottom side of the washer and at the cooling duct exit facilitate accessibility during mechanical production, and simplify the removal of the wax positive for precision casting and also the removal of the MIM green compact after injection moulding.

The intake radius reduces the inlet pressure loss and thus provides a higher pressure loss for accelerating the flow in the further course of the air duct. Also, due to the complete filling of the air duct with air of high flow velocity, the cross-section of the air duct can be reduced while maintaining the same air throughput, improving the stability of the component and also helping to limit the thickness of the washer.

The careful rounding of the transitions from the contact surface to the cooling ducts, to the circumferential rim and the undercut on the collar prevent the washer from cutting into the combustion chamber wall and forming over time firstly a notch and then a crack at this point.

The washer preferably covers the contact points between combustion chamber tile and combustion chamber wall, to prevent any bending stress or creep in the combustion chamber wall. As a result, a thinner sheet can be used for the combustion chamber wall, reducing both costs and weight.

The present invention is described in the following in light of the accompanying drawing, showing an exemplary embodiment. In the drawing.

Figure 2:
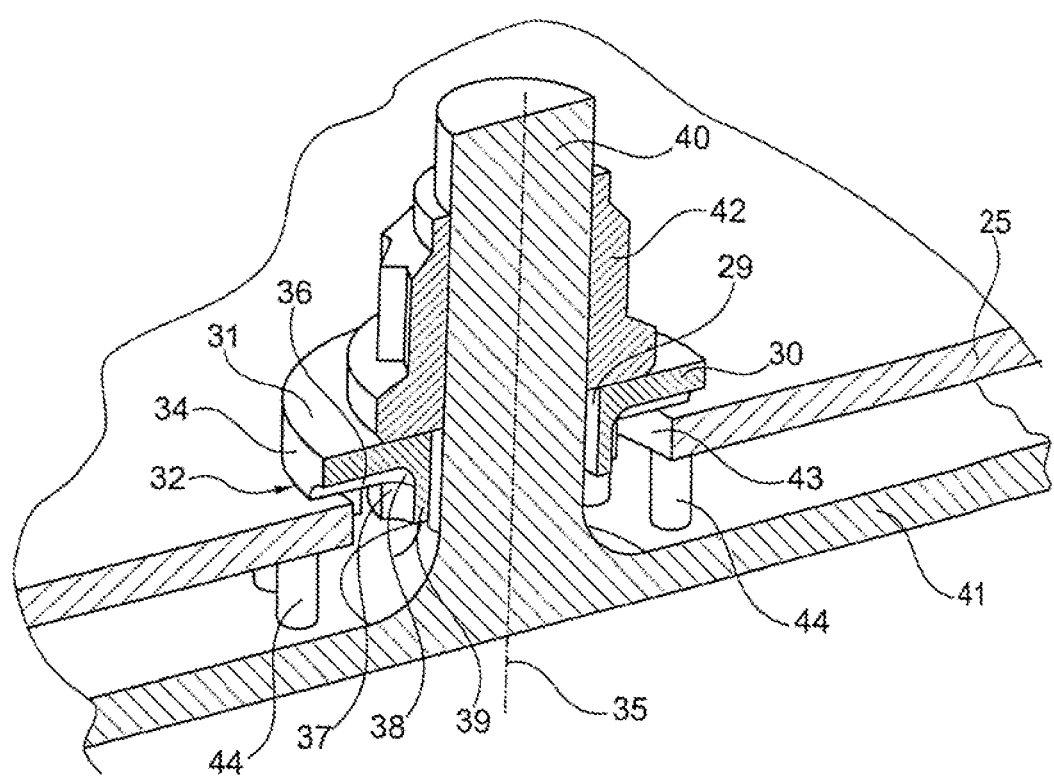
Figure 3:
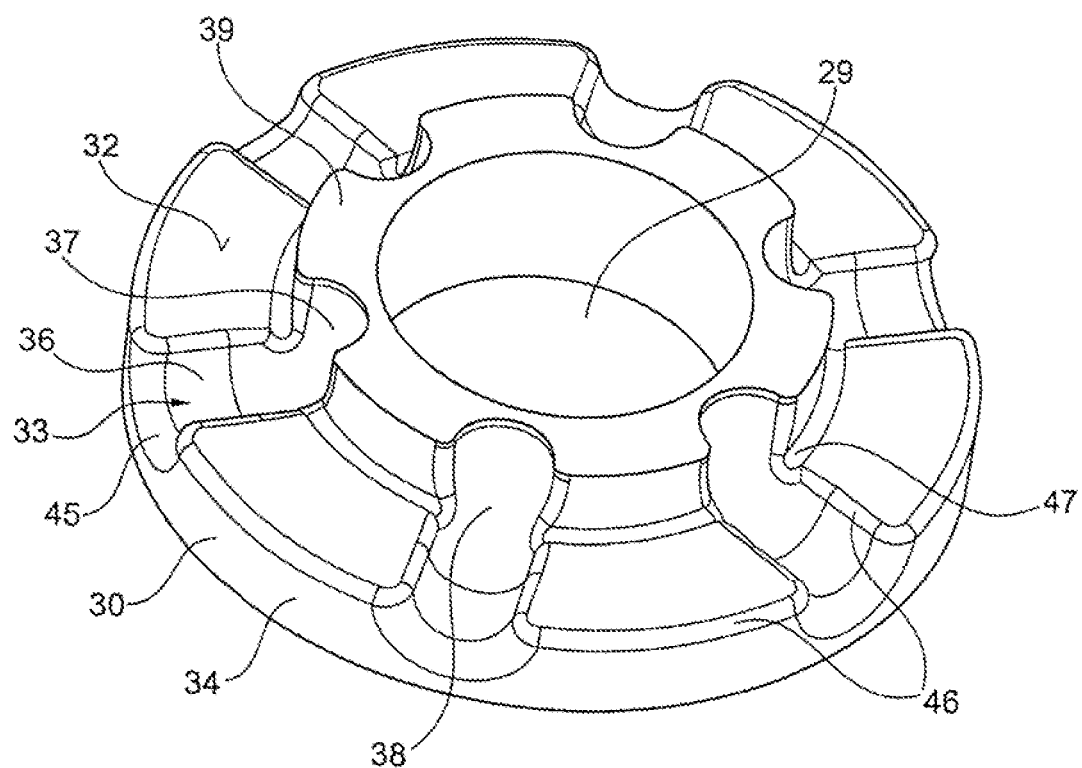

FIG. 1 shows a schematic representation of a gas-turbine engine in accordance with the present invention, FIG. 2 shows a partially perspective sectional view of a washer in accordance with the present invention in the assembled state, and FIG. 3 shows a perspective view of a washer in accordance with the present invention.

The gas-turbine engine 10 in accordance with FIG. 1 is a generally represented example of a turbomachine, where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 2$ linked to hubs 27 of the high-pressure turbine 16 or the intermediate-pressure turbine 17, respectively.

The turbine sections 16, 17, 18 have similar ages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows an assembled state of the washer in accordance with the invention. Firstly, a combustion chamber tile 41 is shown in section which is provided in one piece with a threaded bolt 40. A nut 42 is screwed onto the threaded bolt 40. FIG. 2 furthermore shows in cross-section a combustion chamber wall 25 with a recess 43 through which the threaded bolt 40 is passed. The combustion chamber wall 25 is kept at a distance from the combustion chamber tile 41 by means of spacers 44. This conforms to the state of the art.

A washer in accordance with the invention is arranged between the nut 42 and the combustion chamber wall 25, the latter being braced by the nut 42 against the combustion chamber wall 25.

The washer has a central recess 29 provided on a basic body 30, said basic body 30 having a flat first side 31 in contact with the nut 42. A second side 32 of the washer contacts the upper surface of the combustion chamber wall 25.

As can be discerned in particular from FIG. 3, several air ducts 33 are provided on the second side 32 spread evenly around the circumference, and have a semi-circular or semi-elliptical cross-section. The air ducts 33 extend initially in a radial area 36 and are diverted at a transitional area 38 into an axial area 37. This results in cooling air being introduced parallel to the surface of the combustion chamber wall 25 and discharged parallel to the surface of the threaded bolt 40 towards its base area, as per FIG. 2.

The air ducts 33 are arranged starting from a circumferential rim 34, with a rounded intake area 45 being provided to improve the inflow of cooling air.

In the zone of the axial areas 37 of the air ducts 33, the washer in accordance with the invention is extended by means of a projection 39. Said projection 39 can be designed such that it extends, as shown in FIG. 2, through the recess 43 of the combustion chamber wall 25 such that the cooling air can be directed in more targeted fashion to the base area of the threaded bolt 40 and to the combustion chamber tile 41.

Further rounded areas 46 are provided at the transition of the cooling ducts to the contact surface 32 on the combustion chamber wall 25 and to the circumferential rim 34. Together with an undercut 47 at the transition from the contact surface 32 to the collar 39, they ensure that in the event of combustion chamber walls 25 being curved or deformed in operation there can be no cutting by the edges of the washer into the combustion chamber wall 25 or the recess 43 through which the threaded bolt 40 is passed.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 intermediate-pressure turbine
18 Low-pressure turbine
19 Exhaust nozzle
20 Guide vanes
21 Engine casing
22 Compressor rotor blades
23 Stator vanes
24 Turbine rotor blades
25 Combustion chamber wall
26 Compressor drum or disk
27 Turbine rotor hub
28 Exhaust cone
29 Central recess
30 Basic body
31 First side
32 Second side
33 Air duct
34 Circumferential rim
35 Center axis
36 Radial area of air duct
37 Axial area of air duct
38 Transitional area
39 Projection
40 Threaded bolt
41 Combustion chamber tile
42 Nut
43 Recess
44 Spacer
45 Intake area
46 Rounded area
47 Undercut

The invention claimed is:

1. A washer of a combustion chamber tile of a gas turbine comprising:
   an annular body including a central recess having a center axis, the body including a first side and an opposite second side;
   a flat contact surface arranged on the first side;
   a plurality of grooved air ducts positioned on the second side and isolated from the central recess, each of the plurality of air ducts including a centerline indicating a direction of air flow through the air duct; each air duct having a first portion where the centerline extends generally radially inwardly from an outer circumference of the body toward the center axis, a third portion in a center area of the washer where the centerline extends generally axially and a second portion between the first and third portions where the centerline transitions between the first portion to the third portion.

2. The washer in accordance with claim 1, wherein at least one of the air ducts includes a substantially semi-circular cross-section.

3. The washer in accordance with claim 1, wherein at least one of the air ducts includes a substantially semi-elliptical cross-section.

4. The washer in accordance with claim 1, wherein the second portion is rounded.

5. The washer in accordance with claim 1, and further comprising a rounded intake into the first portion of at least one of the air ducts.

6. The washer in accordance with claim 1, and further comprising a rounded transition between at least one of the air ducts and the second side.

7. The washer in accordance with claim 1, and further comprising a projection positioned on the second side in the center area of the washer and axially extending from a radially extending portion of the second side to form a stepped shape with at least a portion of the central recess positioned in the projection, and with at least a portion of the third portion of each air duct positioned in the projection and isolated from the central recess.

8. The washer in accordance with claim 7, and further comprising an undercut positioned at a transition between the radially extending portion of the second side and the projection.

9. The washer in accordance with claim 1, wherein the centerlines of the first portions are arranged at a distance from the second side.

10. The washer in accordance with claim 1, wherein, for at least one of the air ducts, the centerline of the third portion is arranged at an acute angle relative to the center axis.

11. The washer in accordance with claim 1, wherein an outer shape of the washer is round.

12. The washer in accordance with claim 1, wherein an outer shape of the washer is oval.

13. A fastening system for a combustion chamber of a gas turbine comprising:
   an outer combustion chamber wall including a recess;
   an inner combustion chamber wall positioned adjacent an inner side of the outer combustion chamber wall;
   a first threaded member attached to the inner combustion chamber wall and positioned through the recess;
   a second threaded member threadingly engaging the first threaded member from an outer side of the outer combustion chamber wall;
   a washer positioned between the second threaded member and the outer side of the outer combustion chamber wall, the washer comprising;
      an annular body including a central recess having a center axis, the body including a first side and an opposite second side;
      a flat contact surface arranged on the first side;
      a plurality of grooved air ducts positioned on the second side and isolated from the central recess, each of the plurality of air ducts including a centerline indicating a direction of air flow through the air duct; each air duct having a first portion where the centerline extends generally radially inwardly from an outer circumference of the body toward the center axis, a third portion in a center area of the washer where the centerline extends generally axially and a second portion between the first and third portions where the centerline transitions between the first portion to the third portion;
   wherein at least one of the first threaded member and the second threaded member is positioned through the central recess of the washer, the second threaded member engages the first side of the washer, and the second side of the washer engages the outer side of the outer combustion chamber wall.

14. The fastening system in accordance with claim 13, and further comprising a projection positioned on the second side in the center area of the washer and axially extending from a radially extending portion of the second side to form a stepped shape with at least a portion of the central recess positioned in the projection, and with at least a portion of the third portion of each air duct positioned in the projection and isolated from the central recess.

15. The fastening system in accordance with claim 14, and further comprising an undercut positioned at a transition between the radially extending portion of the second side and the projection.

16. The fastening system in accordance with claim 14, wherein at least one of the air ducts includes a substantially semi-circular cross-section.

17. The fastening system in accordance with claim 14, wherein at least one of the air ducts includes a substantially semi-elliptical cross-section.

18. The fastening system in accordance with claim 14, and further comprising a rounded intake into the first portion of at least one of the air ducts.

19. The fastening system in accordance with claim 14, and further comprising a rounded transition between at least one of the air ducts and the second side.

20. The fastening system in accordance with claim 14, wherein, for at least one of the air ducts, the centerline of the third portion is arranged at an acute angle relative to the center axis.

\* \* \* \* \*